United States Patent [19]

Eddy

[11] Patent Number: 4,686,534
[45] Date of Patent: Aug. 11, 1987

[54] RETRO DIRECTIVE RADAR AND TARGET SIMULATOR BEACON APPARATUS AND METHOD

[75] Inventor: Frederick N. Eddy, Weston, Mass.

[73] Assignee: The United States of America as represented by the Secretary of the Air Force, Washington, D.C.

[21] Appl. No.: 576,498

[22] Filed: Feb. 2, 1984

[51] Int. Cl.[4] .............................................. G01S 7/40
[52] U.S. Cl. .................................. 342/165; 342/160; 342/201; 342/6
[58] Field of Search ................ 343/6.5 SS, 6.8 R, 7.7, 343/18 D, 18 E, 17.7, 6.5 R, 17.2 PC

[56] References Cited

U.S. PATENT DOCUMENTS

| | | | |
|---|---|---|---|
| 3,103,010 | 9/1963 | Heyser et al. | 343/17.7 |
| 3,108,275 | 10/1963 | Chisholm | 343/18 D |
| 3,329,953 | 7/1967 | Adams et al. | 343/17.7 |
| 3,331,070 | 7/1967 | Sommers et al. | 343/17.7 |
| 3,750,173 | 7/1973 | Tackman | 343/17.7 |
| 3,761,825 | 9/1973 | Hill | 343/17.7 |
| 4,319,247 | 3/1982 | Warren | 343/17.7 |
| 4,347,512 | 8/1982 | Sweeney | 343/18 D |

Primary Examiner—Thomas H. Tarcza
Assistant Examiner—Bernarr Earl Gregory
Attorney, Agent, or Firm—Donald J. Singer

[57] ABSTRACT

A radar target simulator apparatus and method especially useful with a pulse compression radar located in a remote, unattended, and unpowered, terrain. Provision for generating signals which will pass through moving target indication (MTI) and minimum velocity threshold circuits are included. Transmission of the detected simulated target data through narrow-band communications lines, such as telephone lines, is contemplated. The capability for minimum discernible signal and radar power output evaluations are also provided.

19 Claims, 8 Drawing Figures

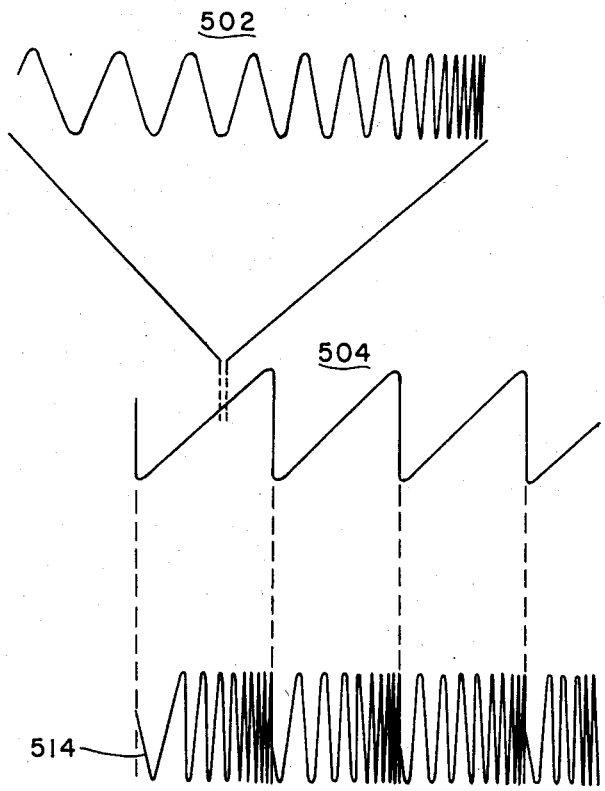
Fig. 5a
Fig. 5b
Fig. 5c
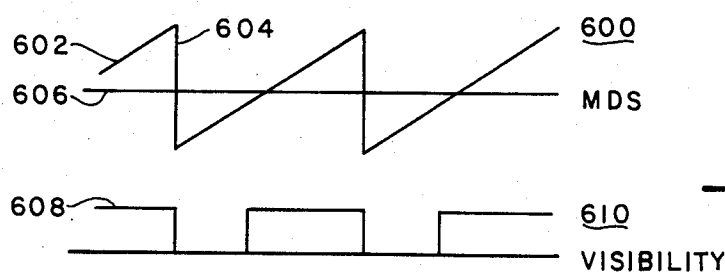
Fig. 6

RETRO DIRECTIVE RADAR AND TARGET SIMULATOR BEACON APPARATUS AND METHOD

RIGHTS OF THE GOVERNMENT

The invention described herein may be manufactured and used by or for the Government of the United States for all governmental purposes without the payment of any royalty.

BACKGROUND OF THE INVENTION

This invention relates to the field of radar target simulating, radar operating verification, and the calibration of radar transmitting and receiving apparatus. The invention particularly relates to passive and signal activated permanent echo target devices.

Radar target simulator devices of both the active and passive type have been known since the use of radar equipment during World War II. Passive signal return devices, that is, devices which return a received signal without amplification or new signal generation have been frequently used with radar sets for both friendly and hostile purposes; an example of such signal return devices is found in target simulating chaff—pieces of metallic foil cut to radar wavelength and dropped from moving aircraft. Other more complex signal return devices are also used with both airborne and ground based radars.

Current practice in the ground based search radar art is to locate unmanned or minimally attended radar equipment at remote sites which are coupled by low frequency telephone quality communication lines to a fusion center where the targets detected by a plurality of radar sets are correlated and merged into a single composite display. The limited communications capability between each radar site and the fusion center makes it desirable to remove unnecessary information from the output of each radar set before transmitting the remaining information to the fusion center. Although the moving target indication (MTI) techniques, which are known in the art, help in performing this removal process, in many instances, strong ground clutter signals and other undesired signals override the moving target indication circuitry and would be transmitted to the fusion center except for the use of target velocity suppression threshold circuits in each radar set. This velocity threshold circuitry is usually adjusted to remove from the radar output signal targets having a velocity below some predetermined minimum such as 50 miles per hour.

The use of remote radar locations and limited capacity communications lines therefore requires target tracking with the suppression of apparent velocities less than some threshold valve, in addition to MTI. Signals presented by a target simulator for use with such radars must therefore appear both to move in range and exhibit apparent doppler shift in order that information reaching the fusion center pass both the MTI and velocity "filters" and be usable for a complete evaluation of the remote radar equipment. It is also desirable for complete evaluation purposes that the information reaching the fusion center be indicative of the minimum discernable signal (MDS) capability of the remote radar set. For this MDS capability, the presence of amplitude modulation or target cross section variation capability is also desirable in a target simulator apparatus used with these radars.

A variety of radar signal return devices or target simulators is also described in the prior art as is shown by the following examples from the U.S. patent art.

The patent of Kenneth A. J. Warren, U.S. Pat. No. 4,319,247, discloses a radar test apparatus which receives a sample signal from a radar transmitter by way of a sampling antenna located close to the radar antenna. The Warrent apparatus processes this sample signal with a delay line and frequency shifter operating at radio frequencies before retransmitting the signal back to the radar by way of the same sampling antenna. The Warren apparatus comtemplates returning a plurality of pulses back to the radar set, each return pulse being of successively different amplitude in order that radar receiver sensitivity be evaluated. In the Warrent patent the apparent location of the returning signals is determined by the properties of a signal delay line rather than by atmospheric propagation time.

The patent of Willis S. Heyser et al, U.S. Pat. No. 3,103,010, discloses a radar test signal generating apparatus wherein signals received by a horn or antenna are offset in frequency through the use of a grid controlled klystron amplifier tube, and reradiated by the same antenna. The frequency or phase relationship of the received and transmitted signals in the Heyser apparatus is altered under the control of a sawtooth voltage generator which is preferably arranged to change the phase of the microwave signal by exactly 1 radio frequency cycle. The Heyser patent contemplates maintaining constant test signal amplitude and varying only phase or frequency in the returned signal in order to simulate the appearance of a moving radar target.

The patent of Edwin C. Adams, U.S. Pat. No. 3,329,953, discloses a radar target simulator which is intended for use with a doppler radar. The Adams patent teaches the use of a radio frequency circulator apparatus which returns the received radio signal without mixing or modulating and without the creation of sideband frequencies. The Adams patent also discloses the use of a bidirectional solidstate phase shifter which is controlled by doppler signature driver circuit to vary the phase of the returned frequency signal.

The U.S. Patent of John P. Chisholm, U.S. Pat. No. 3,108,275, is described in the above Adams patent and discloses an aircraft apparatus for returning a radio frequency signal to a radar set. The Chisholm patent combines an antenna and a semiconductor diode modulator; the diode receives a radio frequency modulation signal that is selected to provide a nonscintilating (i.e. fixed source location) radar return signal in both a sky tracking and beacon tracking mode of radar operation. The antenna of the Chisholm patent can be either a microwave horn or a dipole structure.

The patent of Donald J. Sommers, U.S. Pat. No. 3,331,070, discloses a moving target simulator apparatus. This apparatus uses a microwave diode that is driven by a multivibrator circuit to vary the propagation path lengths of the signal returned to the radar set by one-half wavelength or 180° of radio frequency phase.

The patent of Norbert E. Tackman, U.S. Pat. No. 3,750,173, discloses a frequency translating repeater for returning radio frequency energy to a radar set in frequency shifted form. The Tackman apparatus contemplates the use of two semiconductor diodes which are biased in phase quadrature by an alternating current source to generate sideband frequencies that are a mixture of the radio frequency and modulator frequencies. The Tackman apparatus contemplates the return of signals at the original frequency and at one sideband frequency.

SUMMARY OF THE INVENTION

An object of the present invention is to provide a radar target simulator and calibrator which produce a return signal having an apparent time-varying radar cross section.

Another object of the invention is to provide a radar target simulator and calibrating signal source which is usable with a moving target detecting system.

A further object of the invention is to provide a radar signal return apparatus which requires only small amounts of operating power such as might be provided by a solar cell array or a wind powered generator at a remote location site.

Yet another object of the invention is to provide a radar target simulator which is usable with a pulse compression radar receiver A further object of the invention is to provide a method for calibrating and verifying operation of a pulse compression radar.

Another object of the invention is to provide a radar signal return apparatus usable with a pulse compression radar having a target velocity detection threshold.

The simulator and calibration comprises a remotely located beacon with an antenna which receives pulse compression R.F. signals from the radar transmitter, passes them through a modulator, and reradiates them to the radar receiver. According to the invention, the modulator provides time varying amplitude modulation and time varying frequency and phase modulation components supplemental to the pulse compression modulation, whereby the supplemental modulated signal received by the radar receiver from the beacon enables functionality, power output, sensitivity, range, target velocity, and verifications of the radar.

Other features will be apparent from the detailed description, and as set forth in the appended claims.

BRIEF DESCRIPTION OF THE DRAWINGS

FIG. 5 shows, in FIGS. 5A-5D, several signal waveforms associated with the apparatus of the invention.

FIG. 6 shows the effects of signal strength on the target observed by a radar receiver.

DETAILED DESCRIPTION

Figure 1:
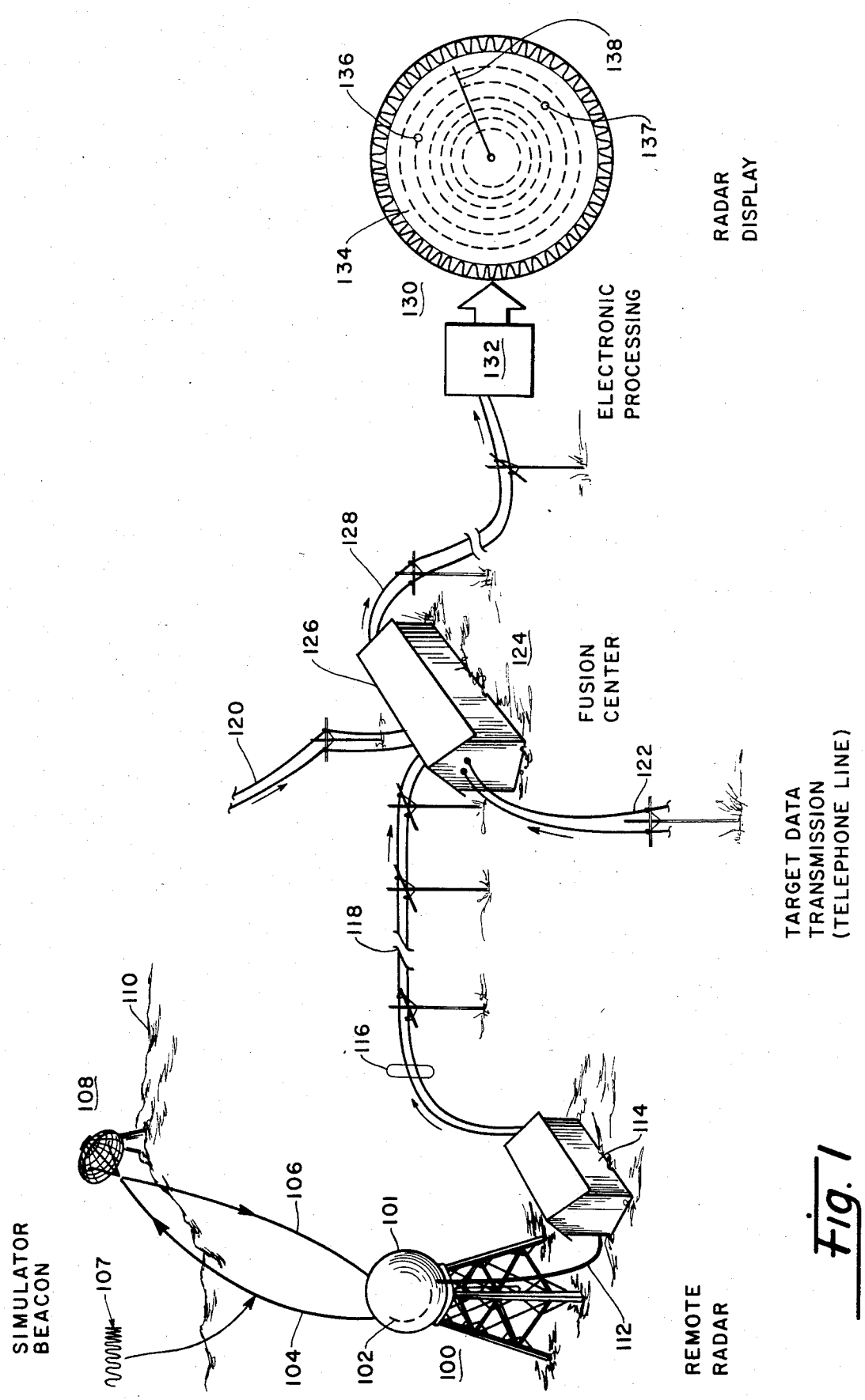
FIG. 1 is overall review of a radar installation which includes a target simulator beacon.

FIG. 1 of the drawings shows a radar apparatus such as might include a target simulator beacon made in accordance with with the present invention. In the FIG. 1 and other descriptions herein the target simulator beacon, is also called a retrodirective calibrator, an operation verification beacon, or simply a beacon. In FIG. 1, the apparatus 100 is a remotely located and possibly unattended search radar which is capable of transmitting radio frequency signals that will be reflected from distant objects such as aircraft are returned to the radar's receiver portion.

The transmitter and receiver of the radar apparatus 100 may operate in accordance with the current practice of using pulse compression modulation wherein useful information is coded into the radio frequency carrier phasing and the pulse length of the transmitted signal. This carrier phase modulation is similar in many respects to carrier frequency modulation and in samples of short duration (with respect to carrier frequency) is indistinguishable from carrier frequency modulation. The presence of pulse compression modulation in the apparatus 100 requires consideration in a target simulating beacon apparatus to be used with this radar.

The radar set 100 is capable of transmitting and receiving signals along the paths 104 and 106 to a remotely located target simulator beacon 108. The beacon 108 may be mounted on any convenient elevated structure including elevated terrain surface such as the hill 110. The radar apparatus 100 includes a radome 101 and a radar antenna generally indicated at 102 which may be contained within a radome 101; this antenna is connected by a signal transmitting cable, such as the coaxial cable 112, to electronic processing and communicating circuits which are located in a building 114. The radar apparatus 100 emits pulse compression signals having radio frequency carrier phase and frequency characteristics as generally indicated at 107 in FIG. 1. The signals emitted by the radar apparatus 100 may for example be coded in accordance with a linear frequency modulation code or a Barker code, a Frank polyphase code, a maximal length sequence code or other phase and frequency coding arrangements which are known in the radar art.

Signals received by the remotely located radar apparatus 100 are intended to be transmitted to a central collecting and processing station which is identified as a fusion center 124 in FIG. 1. This transmission typically occurs by way of low frequency wire circuits such as the telephone lines indicated at 116, 120 and 122 in FIG. 1 and may involve several miles of transmission. The FIG. 1 apparatus also contemplates that other remotely located radar receivers will also transmit signals to the fusion center 124 by way of the telephone lines 120 and 122. The FIG. 1 apparatus also includes electronic computer apparatus located in the building 126 for correlating these plural received signals into a composite image which is in turn transmitted over telephone lines 128 to electronic processing circuitry and a radar display 130. The display 130 may be located at the fusion center or at another location. The display 130 may require additional electronic processing circuitry 132 and will include a screen 134 which can for example have a rotating sweep display line 138. The display indicates targets such as moving aircraft in the manner shown at 137. The display 130 can also show a simulated target return generated by a target simulator beacon 108 in the manner shown at 136.

The presence of a simulated target in the FIG. 1 apparatus can be of significant benefit to operators of the radar system - especially when the FIG. 1 apparatus is installed in remote parts of the world where real targets are not always present, where anamalous propagation may limit low altitude coverage, and in other situations where doubt arises concerning the long-term functionality or stability of the radar or intervening propagation medium.

In accordance with present day practice in the search radar art, it is contemplated that the FIG. 1 apparatus include the ability to reject returns from fixed-position targets such as the hill 110. Exclusion of fixed-position targets not only reduces the confusing and cluttering information presented to an operator on the screen 134 but also limits the data to be transmitted from the remote radar location by the low frequency telephone transmission lines 116. Moving target indication (MTI) circuitry for achieving this rejection of fixed-position signals is well known in the radar art. In addition to such MTI circuits however it is frequently desirable to employ velocity threshold circuitry for rejecting signals from reaching fixed position or slow-moving targets such as, for example, signals for birds or automobiles, signals that escape the MTI circuitry by reason of having large signal strength or nonzero Doppler shift.

The presence of both MTI and velocity threshold circuits in the radar apparatus 100 requires that certain extra features be incorporated in the simulator beacon apparatus 108 in order that signals produced by this apparatus pass through the threshold circuits and reach the display 130 successfully. In reality, the combined consideration of targets moving below and above the predetermined threshold of velocity, transmission over the low frequency telephone lines 116 and 128, pulse compression radar signals, remote unattended operation, low operating power requirements, and the desirability of evaluating radar transmitter power output and receiver sensitivity all collectively influence the characteristics of the simulator beacon 108.

Figure 2:
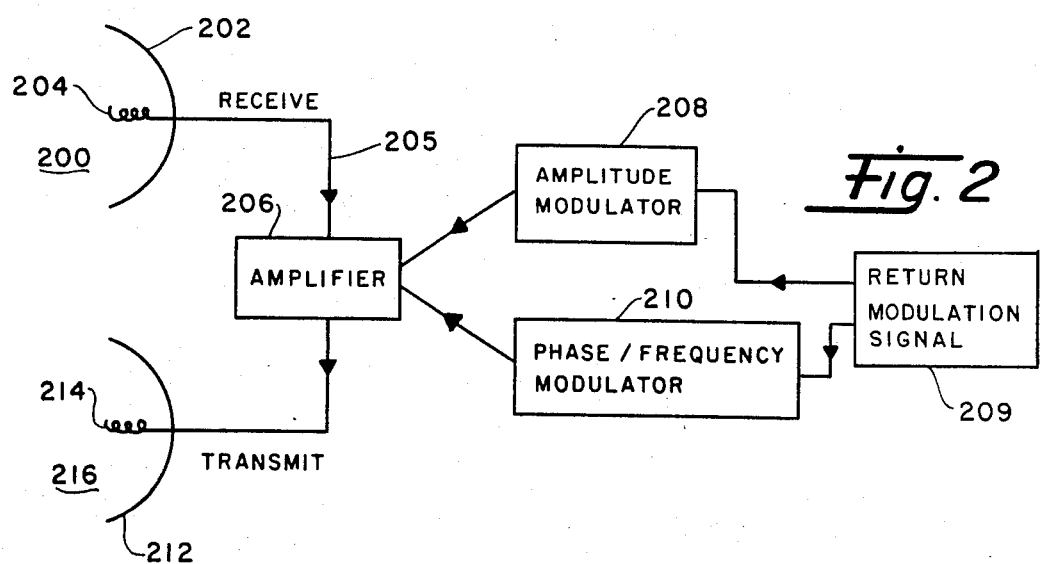
FIG. 2 is a diagrammatic representation of a target simulator beacon apparatus.

FIG. 2 of the drawings shows a block diagram of a target simulator beacon apparatus which is capable of meeting the requirements described for the simulator beacon 108 in FIG. 1. The FIG. 2 apparatus includes a receiving antenna 200 capable of receiving pulse compression modulated radar signals and generating from them an electrical output signal. The antenna 200 is shown to include a parabolic reflector 202 and an active antenna element, such as a dipole, horn, etc., here represented by the spiral 204. Signals from the antenna 200 are transmitted by way of a cable, such as the coaxial cable 205, to an amplifier 206 and thence to a transmitting antenna 216 which also includes a parabolic reflector 212 and a spiral active element 214.

Coupled to the amplifier 206 in FIG. 2 is a phase or frequency modulator 210 and an amplitude modulator 208. These modulators perform the function of adding to the pulse compression modulation of the received radar signal additional modulation components which are in both the phase or frequency domain and the amplitude domain. The manner of coupling the phase or frequency modulator 210 to the amplifier 206 is well known in the art and could, for example, be accomplished as shown in the Heyser U.S. Pat. No. 3,103,010 patent or the Chisholm U.S. Pat. No. 3,108,275 patent or the Adams U.S. Pat. No. 3,329,953 patent. The Adams patent is limited to fixed frequency modulation. The disclosure of these patents is incorporated herein by reference. The frequency or phase modulation of FIG. 2 could also be provided through the use of a voltage controlled oscillator driving diodes, ferrite modulators, traveling-wave tubes and other phase-modulating devices as known in the electronic art.

The manner of arranging the amplitude modulator 208 and the amplifier 206 is also well known in the art and could, for example, consist of changing one of the voltages applied to the amplifier 206, such as the final amplifier plate voltage or the collector voltage in the case of a transistorized amplifier, in response to an amplitude modulating signal.

The phase or frequency modulating signal applied to the amplifier diode or other modulating device 206 is intended to introduce an apparent range displacement representing movement of a target at some velocity above the velocity threshold of the FIG. 1 radar system. In the present invention it is found desirable when operating with linear-FM "chirp" radars for the modulator to change the frequency of the received carrier in a linear manner so as to generate a linearly-varying range displacement corresponding to uniform velocity. A modulating waveform for this purpose has the appearance of a sawtooth such as is shown at 504 in FIG. 5 of the drawings and is described below.

Other radar pulse-compression waveforms, such as Barker codes, maximal-length (M-sequence) or other shift-register codes, Frank poly-phase codes, and the like also allow range-displacement modulation, but in these instances the local modulation must be synchronized with the received waveform.

It is also found desirable to apply a linear time related amplitude modulating signal to the reradiated signal in FIG. 2 by way of the amplitude modulator 208. The intent of this amplitude modulation is to change the strength or power level of the signal transmitted by the antenna 216 in order that the signal received at the radar set 100 in FIG. 1 appear to return from a target of varying radar cross section. It is desirable for this received signal to have strength variations ranging from a level below the minimal discernible signal (MDS) level of the radar receiver, through the level equaling the minimum discernible signal and thence to a signal, exceeding the minimum discernible signal. The effect of these signals on a displayed image is shown in FIG. 6. In lieu of the foregoing amplitude modulation technique for evaluating radar MDS, the range-displacement modulation can be applied using square-wave approximations of the ideal sinusoidal modulation waveforms such that the frequency harmonics of these square-wave signals generate additional simulated targets with greater range displacement and lesser apparent cross-section. The number of harmonically related targets detected by the radar in this instance is indicative of its sensitivity.

If the amplifier 206 is arranged such that the power level of the signal transmitted by antenna 216 is directly related to the strength of the signal received at the antenna 200 then the blip-scan ratio or percentage of time that the simulated target 136 in FIG. 1 is visible is also a useful function of: the transmitter power in the radar set 100, the minimum discernable signal capability of the radar receiver, the radar antenna pattern, and the modulation intensity applied by the modulator 208. The sensitivity of the target indication of the radar display to these fundamental parameters of the radar's performance allows an operator to quickly and conveniently evaluate the present condition of the radar set.

Figure 3:
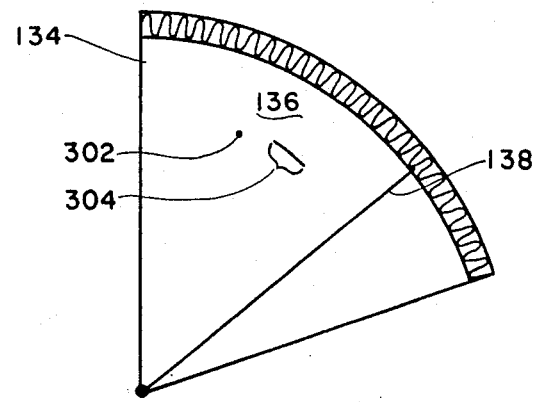
FIG. 3 is an enlarged view of a portion of the radar display in FIG. 1.

In FIG. 3, the rotating sweep display line 138 is shown to have painted the simulated target return 136 in the form either of an arcuate line 304 or a single dot 302 in the case of a digitally synthesized display.

Although the FIG. 2 apparatus is capable of performing the functions required of the simulator beacon 108 in FIG. 1, it is possible to simplify and refine this apparatus into a form which is less complex and less expensive to fabricate. This refined form is also suitable for use in a remote unattended simulator beacon location where the contributions of regular maintainence and commercial power are not available. Such a form of the simulator beacon apparatus is shown in FIG. 4 of the drawings.

Figure 4:
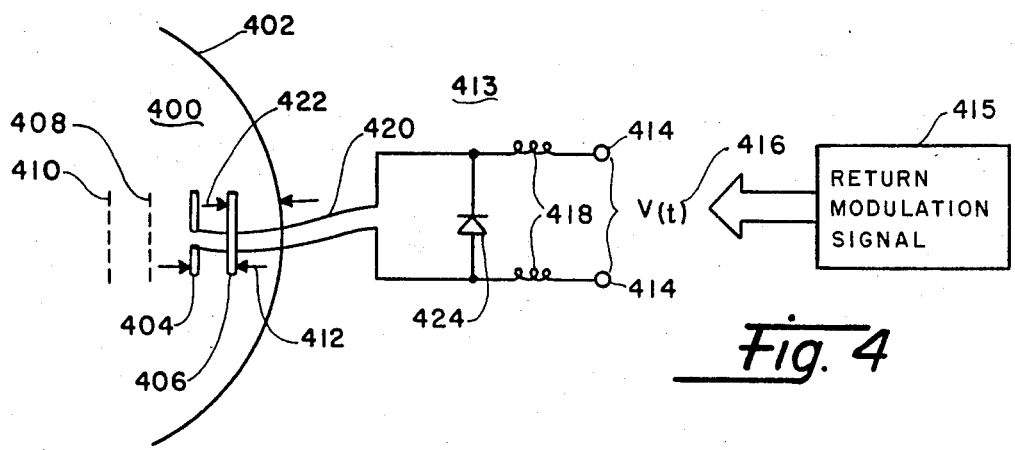
FIG. 4 is a diagrammatic representation of a target simulator beacon of simpler form.

In FIG. 4 there is shown, at 400, an antenna apparatus which includes a plurality of halfwave dipole elements 404–410. These elements are located along the axis of a parabolic reflector 402 and couple to electronic circuitry 413 a signal transmission line—indicated generally at 420. The FIG. 4 apparatus is capable of performing the functions of the simulator beacon 108 with the use of very little energy and a minimum number of active electronic components.

The FIG. 4 antenna includes reflector 402 and one or more active dipole elements 404, 406, 408, 410; each of the dipole elements is preferably one-half wavelength in physical length and can be sequentially open- or short-circuited so as to vary the effective point of reflection and hence reradiated signal phase. The dipole elements 408 and 410 in FIG. 4 are shown in dotted form to indicate their optional nature; one or more of such elements may also be connected with the transmission line 420 in an alternative arrangement of the FIG. 4 apparatus; elements in addition to those shown can of course be added to the antenna 400.

The electronic circuitry 413 in FIG. 4 includes a semiconductor crystal diode 424, a pair of radio frequency isolating chokes 418 and a source of time-varying modulating signals 416 applied to a pair of terminals 414.

The FIG. 4 apparatus is capable of imparting both amplitude and phase or frequency modulation to the phase compression or other signals received from the radar set 100 in FIG. 1. The antenna 400 in FIG. 4 serves in both the receiving and transmitting modes; current induced in the antenna elements by the received signals produces electromagnetic radiation from these elements that is received by the receiver portion of the radar apparatus 100.

Amplitude modulation is imposed on the reradiated signals from the FIG. 4 antenna by way of conductivity variations in the crystal diode 424. Conductivity variations result from the bias operating point of the diode 424 being moved in response to the modulating signals 416. As is known in the diode art, the effective radio frequency impedance of a diode is a function of the total current flowing in the diode and is therefore variable in accordance with the amplitude of the modulating signal 416. The varying diode radio frequency impedance is used to control the overall receiving and reradiating efficiency of the antenna in FIG. 4 so that the signal received at the radar receiver along the path 106 in FIG. 1 is amplitude dependent on the modulating signal 416.

The phased relationship between the received and transmitted carrier signals in the FIG. 4 apparatus is also varied by the action of the diode 424 in response to the modulating signal 416. Two mechanisms in the FIG. 4 apparatus are operative to change the phase relationship between received and transmitted signals; these mechanisms are the length of the path traversed by the received and reradiated signals in the antenna apparatus 400 and the known ability of a diode modulator to introduce sideband frequencies including the sum and difference frequencies of the carrier and modulating signal. The path length mechanism operates on the concept that the length of the path traversed by the radio frequency signals is leaving and returning to the antenna 102 in FIG. 1 is different depending upon whether the signal is received and transmitted by the dipole 404 or the dipole 406, the selection between these two diple elements is in turn dependent upon the conductivity or the radio frequency impedance of the diode 424. The longer path length which results when the diode 424 is open produces a different carrier phase relationship in the return signal than that which occurs when the diode 424 is shorted.

Alternatively, as is known in the crystal diode modulator art, sideband frequencies generated by a diode modulator can be suppressed or cancelled through the use of wave cancelling techniques. These techniques involve selected lengths of transmission line as is shown, for example, in the previously mentioned patent of Tackman, U.S. Pat. No. 3,750,173. As is also described in the Tackman patent it is possible to use a pair of crystal diodes and a pair of phase quadrature modulating signals to obtain selected modulation sideband frequencies in a radar apparatus.

The waveform of the modulating signal applied to the terminals 414 therefore determines the characteristics of both the amplitude and the phase of frequency modulation in the simulator beacon 108. This waveform, as a result determines both the velocity of the simulated target and the fraction of time that the simulated target 302 or 304 in FIG. 3 is observed. The manner in which the preferred sawtooth waveform interacts in amplitude modulation form with the minimum discernable signal level of the radar set and produces a varying paint length for a simulated target 136 is shown in FIG. 6 of the drawings.

In FIG. 6 the line 606 represents the minimum discernible signal threshold for the radar apparatus 100 while the sawtooth waveform of 602 represents the amplitude of the signal received from the simulator beacon 108. As shown by the visibility waveform 608, the simulated target becomes invisible to the radar display at the time 604 where the received signal amplitude falls below the MDS or the minimum discernible signal level. As shown by the relative durations of the high and low portions of the visibility waveform at 610 the fraction of time the signal is observed depends upon the relative amplitude of the received signal and the minimum discernible signal level. Range displacement harmonics may also be used to evaluate radar sensitivity in the manner previously discussed.

A waveform other than a sawtooth or two separate waveforms could be employed for the amplitude and phase or frequency components of modulation in the simulator beacon 108 if desired.

Several waveforms relating to the preferred sawtooth modulation in the described apparatus of the invention are shown in FIG. 5 of the drawings. FIG. 5a represents the waveform associated with one pulse from a pulse compression radar employing linear frequency modulation. As shown at 502 in FIG. 5a the period of the carrier waveform decreases continuously with this modulation from left to right during a pulse interval. Pulse compression waveforms of this type find increased use in modern-day radar because of the reduced peak radar power required for a given average power in comparison with other modulation techniques, and because of certain jamming and interference advantages which can be realized with this form of modulation.

FIG. 5b in the drawings shows a sawtooth waveform such as has been described for imparting apparent range displacement by means of the frequency modulation in the FIG. 2 and FIG. 4 apparatus.

The time duration of the radar's chirped pulse 502 is short as compared with the range displacement modulation period shown at 504. The pulse duration 502 may be in the order of microseconds while range modulation period 504 may be in the order of one minute.

The range displacement modulation 504 gives rise to a radar pulse frequency shift that varies in time as shown by waveform 514 in FIG. 5c. If amplitude modulation is applied for the purpose of calibrating radar sensitivity, its period is large as compared with the range displacement modulation's period in FIG. 5b.

Addition of amplitude and phase or frequency domain modulation to the FIG. 5a waveform can be achieved with the FIG. 4 apparatus with a minimal expenditure of power supply energy. One arrangement for performing this function is through using state-of-the-art integrated circuits such as complementary metal oxide semiconductor (CMOS) circuitry. An embodiment of this type is within the capability of the energy developed from a sun-powered solar array or a wind-powered generator when the simulator beacon apparatus is located in an unpowered remote location. The circuit arrangement used for such a CMOS modulator might include, for example, an up-down counter connected to an digital-to-analog converter which is in turn drives a voltage controlled oscillator. Such circuits are known in the electronic circuit art.

An alternative modulating waveform to that shown in FIG. 5b can also be employed to cause passage of the simulated target signal through the minimum velocity threshold apparatus of FIG. 1. This alternate waveform, a square wave, involves replacement of the sloping lines in FIG. 5b with some proportion of times above and below the centroid of the illustrated sawtooth wave; that is, by forming a symmetric or asymmetric squarewave. In this alternative waveform embodiment the pulse compression waveform of FIG. 5a would be modified by the imposition of periodic speeding and slowing of the carrier and the simulated target 136 in FIG. 3 would thus appear to be broken or dotted in nature, being alternately displaced to apparent ranges closer and further than its true position. The range displacement harmonics resulting from use of nonsinusoidal waveforms, as previously discused, can still be used for evaluating radar sensitivity.

While the apparatus and method herein described constitute a preferred embodiment of the invention, it is to be understood that the invention is not limited to this precise form of apparatus or method and that changes may be made therein without departing from the scope of the invention which is defined in the appended claims.

For example, in addition to crystal diodes, transistors, SCR's, ferrite devices, traveling-wave tubes, etc., can be used to impart the required modulations. This applies throughout—wherever the term crystal diode is used herein.

I claim:

1. Radar apparatus comprising the combination of: pulse compression radar transmitter and receiver means including low velocity target suppression threshold apparatus for emitting and receiving radio frequency radar signals having predetermined variations of carrier phase and frequency; beacon antenna means remotely fixed in position from said transmitter and receiver means for receiving pulse compression radio frequency signals therefrom, said antenna means including a radio frequency electrical signal conveying port;
retroradiating means fixed in position from said transmitter for transmitting to said radar transmitter and receiver means a return radio frequency signal related to said antenna means radio frequency electrical signal;
radio frequency signal generator means connected with said retroradiating means for generating said related radio frequency electrical signal including time varying amplitude modulation and time varying frequency and phase modulation components supplemental to said pulse compression modulation from said antenna means radio frequency electrical signal and from modulation input signals;
modulation signal generator means connected with said radio frequency signal generator means and generating beacon modulation signals for varying the amplitude of said return radio frequency signal above and below a minimum discernible signal level in said radar receiver means and for varying the frequency and phase of said return radio frequency signal to velocity representations above and below said target suppression threshold;
whereby the modulated signal received by said receiver means from said retroradiating means enables transmitter power output, receiver sensitivity, and target velocity threshold verifications of said pulse compression radar transmitter and receiver means.

2. The radar apparatus of claim 1 wherein said retroradiating means includes said beacon antenna means, a single antenna means being used for both receiving and retroradiating.

3. The radar apparatus of claim 2 wherein said radio frequency signal generator means includes a semiconductor crystal diode, the operating point of said diode being moved along a characteristic curve in response to said time-varying modulation signal generator components.

4. The radar apparatus of claim 3 wherein said pulse compression radar means includes linear frequency modulation means.

5. The radar apparatus of claim 4 further including a second semiconductor crystal diode in said radio frequency signal generator means, said two crystal diodes being driven in phase quadrature by time-varying periodic modulator signals.

6. The apparatus of claim 4 wherein said modulation signal generator signal includes a sawtooth waveform.

7. The radar apparatus of claim 1 wherein said pulse compression radar means includes modulation means operating in accordance with a Barker code.

8. The radar apparatus of claim 1 further including fusion center means for combining target indications received from a plurality of radar transmitters and receivers into a composite single target indication.

9. Passive retrodirective calibration and target simulation apparatus for a radar transmitter and receiver set comprising:
parabolic dish antenna means remotely located from said transmitter and receiver set and including first and second quarter wave spaced dipole elements for bidirectionally communicating microwave radio frequency signals with said transmitter and receiver, said first dipole element being a short-circuited reflector element and said second dipole element being an active element having signal conveying terminals;

semiconductor diode means connected to said second element signal conveying terminals for varying the impedance connecting said terminals incrementally between short circuit and open circuit conditions in response to diode controlling modulation, radio frequency current flow in said diode and said second dipole antenna also generating a radiated retrodirected radio frequency signal receivable by said radar receiver;

modulation signal generating means coupled to said diode for changing the voltage and current operating point and the radio frequency impedance thereof, the strength and carrier phasing of said radiated retrodirected signal being responsive to said diode radio frequency impedance, said modulation signal generating means including means for changing said diode controlling signal in accordance with a time related algorithm;

whereby said retrodirected radio frequency signal provides a simulated target of apparent varying radar cross section and target velocity in a known location with respect to said radar for calibration and function verification of said radar transmitter and receiver.

10. The retrodirective calibration and target simulation apparatus of claim 9 wherein said radar transmitter and receiver set include pulse compression modulation means.

11. The apparatus of claim 9 wherein said time related algorithm includes a sawtooth waveform signal.

12. A method for verifying and calibrating a pulse compression radar set having low velocity target suppression comprising the steps of:

receiving a pulse compression radio frequency signal from said radar set, the received signal including pulse compression determined first components of carrier phase and frequency modulation;

modulating said received signal with a second, time varying, component of carrier phase and frequency modulation, first and second time portions of said time varying component representing target velocities above the threshold of said target suppression;

radiating back to said radar set a signal representing said second component modulated signal;

verifying the presence and absence of target indications corresponding with said first and second time portions of said second modulation component in the output of said radar set.

13. The method of claim 12 further including the step of amplitude modulating said second component modulated signal with a third time varying modulation component, first and second time portions of said third time varying amplitude modulation component being interpretable as signals above and below the minimum discernible signal threshold at said radar set.

14. The method of claim 13 further including applying a sawtooth-shaped waveform to generate said second and third modulation components.

15. The method of claim 14 including the step of employing said sawtooth-shaped waveform for varying the operating point of a radio frequency crystal diode for generating said amplitude and phase and frequency modulation components.

16. Verifying and calibrating apparatus for a pulse compression radar set having a predetermined target velocity suppression threshold comprising:

means remotely located from said radar set for receiving a pulse compression radio frequency signal therefrom, the received signal including pulse compression related first components of carrier phase and frequency modulation;

means for modulating said received signal with a second time varying component of carrier phase and frequency modulation, first and second time portions of said time varying component representing target velocities above said target velocity suppression threshold;

means for radiating back to said radar set a signal representing said second modulated signal;

means for indicating the presence and absence of target indications corresponding with said first and second time portions of said second modulation component in the target output of said radar set.

17. The apparatus of claim 16 further including means for amplitude modulating said received signal with a third time varying modulation component.

18. The apparatus of claim 17 wherein the period of said third time varying modulation component is selected to permit distinguishing return signal portions having amplitudes below and above the minimum discernible signal level in the output of said radar set.

19. The apparatus of claim 16 wherein said second time varying component and said third time varying component of modulation include sawtooth-shaped time waveforms.

* * * * *